United States Patent
Watanabe et al.

(10) Patent No.: US 9,849,736 B2
(45) Date of Patent: Dec. 26, 2017

(54) TIRE POSITION DETERMINATION SYSTEM

(71) Applicant: KABUSHIKI KAISHA TOKAI RIKA DENKI SEISAKUSHO, Aichi (JP)

(72) Inventors: Naoki Watanabe, Aichi (JP); Yuta Tsuchikawa, Aichi (JP); Katsuhide Kumagai, Aichi (JP); Masahiro Matsushita, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 0 days.

(21) Appl. No.: 15/035,028

(22) PCT Filed: Nov. 12, 2014

(86) PCT No.: PCT/JP2014/079929
§ 371 (c)(1),
(2) Date: May 6, 2016

(87) PCT Pub. No.: WO2015/072475
PCT Pub. Date: May 21, 2015

(65) Prior Publication Data
US 2016/0288595 A1    Oct. 6, 2016

(30) Foreign Application Priority Data

Nov. 15, 2013  (JP) ................................. 2013-236825
Mar. 27, 2014  (JP) ................................. 2014-066619

(51) Int. Cl.
*B60C 23/00*  (2006.01)
*B60C 23/04*  (2006.01)
(Continued)

(52) U.S. Cl.
CPC .......... *B60C 23/0489* (2013.01); *B60C 23/02* (2013.01); *B60C 23/04* (2013.01);
(Continued)

(58) Field of Classification Search
CPC ........................... B60C 23/0416; B60C 23/02
(Continued)

(56) References Cited

U.S. PATENT DOCUMENTS 8,922,359 B2 * 12/2014 Lim ................... B60C 23/0486
                                                340/444
9,180,742 B2    11/2015 Kosugi et al.
(Continued)

FOREIGN PATENT DOCUMENTS

JP    2011-527971    11/2011
JP    2012-531360    12/2012
(Continued)

OTHER PUBLICATIONS

International Search Report in International Patent Application No. PCT/JP2014/079929, dated Jan. 27, 2015.
(Continued)

*Primary Examiner* — Eric M Blount
(74) *Attorney, Agent, or Firm* — Greenblum & Bernstein, P.L.C.

(57) ABSTRACT

A tire position determination system is provided with: a plurality of tire air pressure transmitters each capable of transmitting a first radio signal including air pressure data and a tire ID; a plurality of axle rotation detection units each generating axle rotation information; and a receiver mounted to a vehicle body and capable of receiving the first radio signal. Each of the plurality of tire air pressure transmitters includes a specific position detection unit capable of detecting the arrival of the tire air pressure transmitter at a specific position on a trajectory of rotation of the tire, and a transmission control unit that, based on a result of detection, generates a second radio signal including data indicating the arrival of the tire air pressure transmitter at the specific position on the trajectory of rotation of the tire and the ID.

(Continued)

The receiver includes a position determination unit that determines a tire position of the plurality of tires based on the second radio signal.

11 Claims, 11 Drawing Sheets

(51) Int. Cl.
    *G01L 17/00*     (2006.01)
    *B60C 23/02*     (2006.01)
    *G08C 17/00*     (2006.01)
    *G08C 19/00*     (2006.01)

(52) U.S. Cl.
    CPC ...... *B60C 23/0415* (2013.01); *B60C 23/0416* (2013.01); *B60C 23/0455* (2013.01); *G01L 17/00* (2013.01); *G08C 17/00* (2013.01); *G08C 19/00* (2013.01)

(58) Field of Classification Search
    USPC .......... 340/442–448; 73/146.3, 146.4, 146.5, 73/146.8
    See application file for complete search history.

(56) References Cited

U.S. PATENT DOCUMENTS

2002/0047715 A1* 4/2002 Holm ........................ G01P 3/44
    324/683
2006/0044125 A1* 3/2006 Pierbon ............... B60C 23/0416
    340/442
2006/0142911 A1* 6/2006 Allard ................. B60C 23/0416
    701/33.9
2008/0246467 A1* 10/2008 Vial ..................... G01D 5/2033
    324/207.25
2010/0231403 A1* 9/2010 Bortolin .............. B60C 23/0416
    340/686.1
2011/0169627 A1 7/2011 Fink
2012/0059551 A1* 3/2012 Juzswik ............... B60C 23/0416
    701/49
2012/0253590 A1 10/2012 Fink
2015/0020584 A1 1/2015 Okada et al.

FOREIGN PATENT DOCUMENTS

| | | |
|---|---|---|
| JP | 2013-060105 | 4/2013 |
| JP | 2013-147109 | 8/2013 |
| WO | 2013/133307 | 9/2013 |
| WO | WO 2013133307 A1 * | 9/2013 ......... B60C 23/0416 |

OTHER PUBLICATIONS

International Preliminary Report on Patentability in International Patent Application No. PCT/JP2014/079929, dated May 17, 2016 (English translation).

* cited by examiner

Fig.4
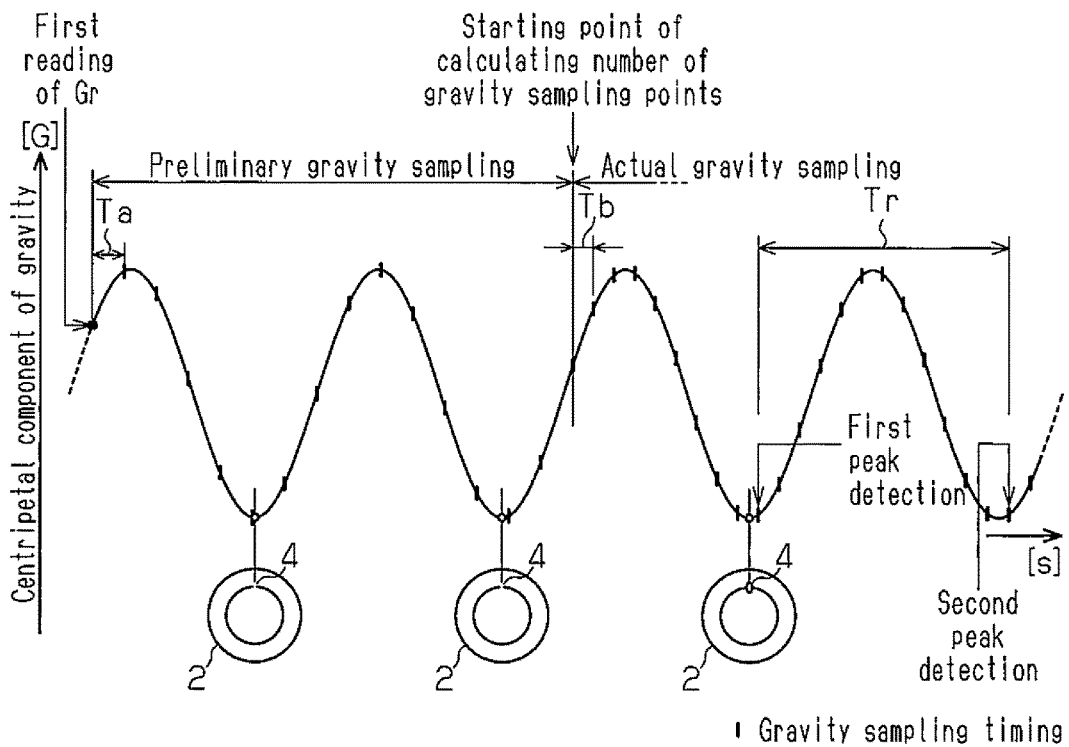
Fig.5
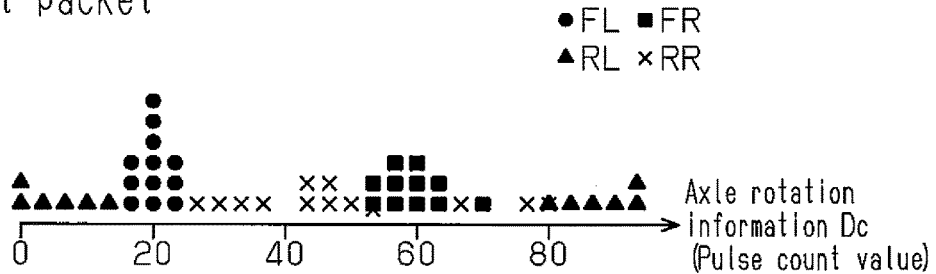
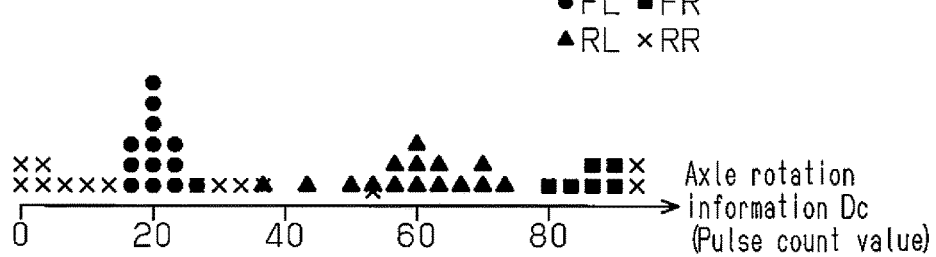

Absolute evaluation
(Is deviation smaller than or equal to threshold value?)

Relative evaluation
(Is difference of deviation greater than or equal to threshold value?)

$$\text{Average of deviation} = \frac{\Sigma |x-x'|}{n} \quad \cdots (\alpha)$$

$$\text{Standard deviation} = \sqrt{\frac{\Sigma (|x-x'|^2)}{n-1}} \quad \cdots (\beta)$$

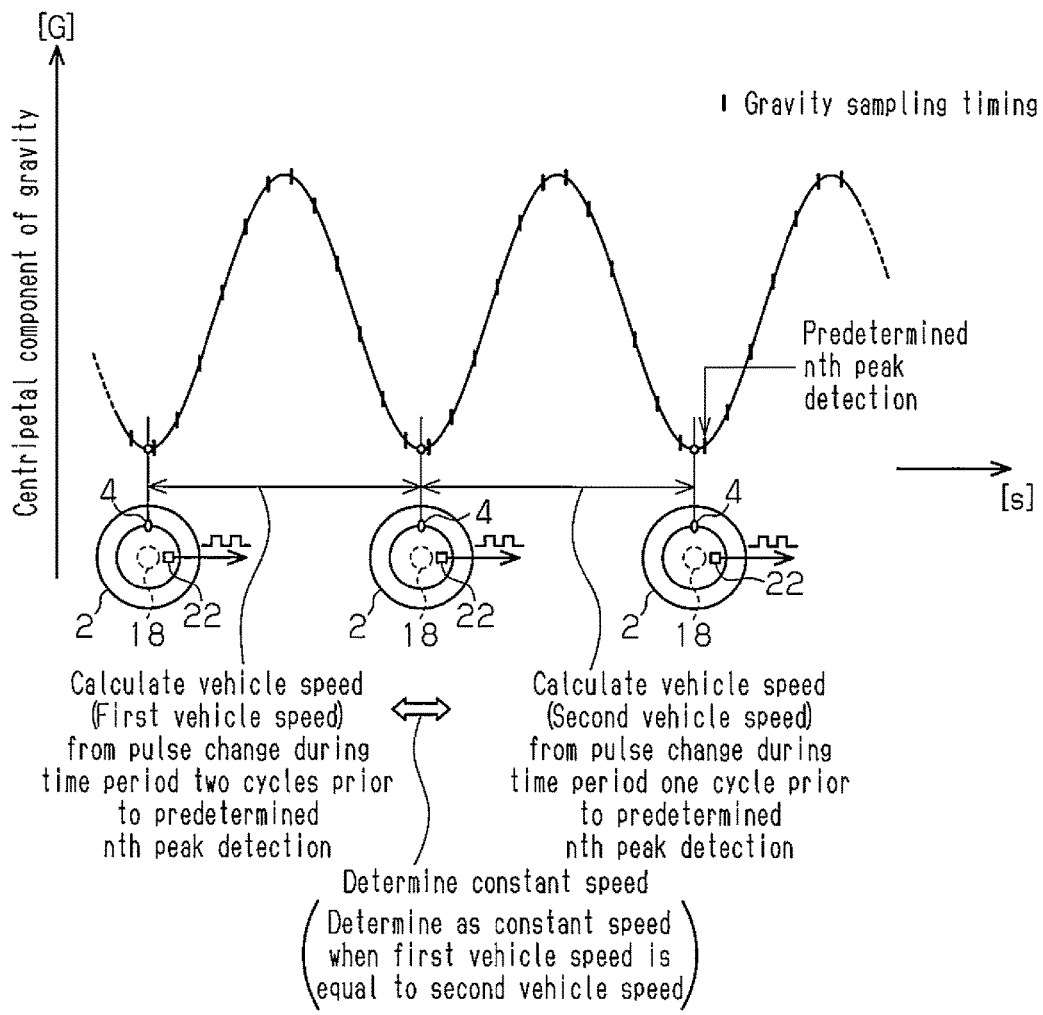

Fig.13

|  | ID1 | ID2 | ID3 | ID4 |
|---|---|---|---|---|
| Front right axle 18a | △ | × | ... | ... |
| Front left axle 18b | △ | ○ | ... | ... |
| Rear right axle 18c | × | × | ... | ... |
| Rear left axle 18d | × | × | ... | ... |

Fig.14

|  | ID1 | ID2 | ID3 | ID4 |  |
|---|---|---|---|---|---|
| Front right axle 18a | ○ | × | ... | ... | |
| Front left axle 18b | △ | ○ | ... | ... | ← Eliminate from candidates |
| Rear right axle 18c | × | × | ... | ... | |
| Rear left axle 18d | × | × | ... | ... | |

| | FL | FR | RL | RR |
|---|---|---|---|---|
| ID1 | 1 | 2 | 4 | 3 |
| ID2 | 2 | 1 | 3 | 4 |
| ID3 | 3 | 4 | 1 | 2 |
| ID4 | 4 | 2 | 3 | 1 |

35

US 9,849,736 B2

TIRE POSITION DETERMINATION SYSTEM

TECHNICAL FIELD

The present invention relates to a tire position determination system.

BACKGROUND ART

Patent Document 1 discloses a known example of a tire position determination system (auto-location function) that automatically determines tire positions to monitor the air pressure of each tire. The system of Patent Document 1 includes first sensors (4a to 4d), which are respectively arranged in wheels (2a to 2d), four second sensors (5a to 5d), which correspond to specific positions of a vehicle, and a measurement system (3), which determines wheel positions. The first sensors transmit signals (S4a to S4d) that indicate wheel positions to the measurement system. The second sensors measure angular positions of wheels and calculate measurement values (S5a to S5d) of the wheel angle positions. The measurement system determines the wheel positions by obtaining phase positions (W1a to W3a and W1b to W3b) of the signals of the first sensors from the measurement values and checking whether or not the phase positions remain within predetermined allowable ranges (WTa and WTb) during a predetermined monitoring period.

PRIOR ART DOCUMENT

Patent Document

Patent Document 1: Japanese Laid-Open Patent Publication No. 2011-527971

SUMMARY OF THE INVENTION

Problems that are to be Solved by the Invention

The tire position determination system of Patent Document 1 does not use an initiator. In such a type of system, there is need for developing a technique that allows for accurate tire position determination within a short period of time.

It is an object of the present invention to provide a tire position determination system that allows for accurate tire position determination within a short period of time.

Means for Solving the Problem

One aspect of the present invention is a tire position determination system including tire pressure transmitters, axle rotation detectors, and a receiver. The tire pressure transmitters are respectively coupled to tires. Each of the tire pressure transmitters is capable of transmitting a first radio wave signal that includes pressure data and a tire ID. The axle rotation detectors are respectively arranged on axles. Each of the axle rotation detectors detects rotation of a corresponding one of the axles and generates axle rotation information. The receiver is arranged on a vehicle body. The receiver is capable of receiving the first radio wave signal transmitted from each of the tire pressure transmitters. Each of the tire pressure transmitters includes a specific position detector and a transmission controller. The specific position detector detects that the tire pressure transmitter has reached a specific position on a rotation path of the tire. The transmission controller generates a second radio wave signal, which includes an ID and data indicating that the tire pressure transmitter has reached a specific position on the rotation path of the tire, based on a detection result of the specific position detector and transmits the second radio wave signal from the tire pressure transmitter. The receiver includes an axle rotation information acquisition unit and a position determination unit. The axle rotation information acquisition unit acquires the axle rotation information from each of the axle rotation detectors whenever the receiver receives the second radio wave signal. The position determination unit calculates a distribution of the axle rotation information for each of the IDs by collecting statistics of the axle rotation information for each of the IDs and determines tire positions of the tires by specifying an ID of a tire that rotates in synchronism with the axle rotation information of each of the axles based on the distribution.

It is preferred that, in an operation of the tire pressure transmitter, a relatively short first time period, during which transmission of a radio wave signal is allowed, and a second time period, during which transmission of a radio wave signal is temporarily stopped, be alternately repeated, and that the transmission controller transmit the second radio wave signal a number of times in the first time period.

It is preferred that the position determination unit perform absolute evaluation, which determines validity of the distribution using the axle rotation information of each of the axles, and relative evaluation, which determines validity of the distribution using the axle rotation information of the axles, to determine a tire position based on a result of the absolute evaluation and a result of the relative evaluation.

It is preferred that the position determination unit perform relative evaluation that determines validity of the distribution using variance of the axle rotation information of the axles to determine a tire position based on a result of the relative evaluation.

It is preferred that the receiver include a traveling determination unit that determines a traveling state and a weighting unit that weights the second radio wave signal received by the receiver based on a determination result of the traveling determination unit and that the position determination unit calculate a distribution of the axle rotation information for each of the IDs by collecting statistics on the axle rotation information that reflects the weighting for each of the IDs and determines tire positions of the tires based on the distribution.

It is preferred that the traveling determination unit be capable of determining a speed of a vehicle and that the weighting unit weight the second radio wave signal based on speed dependency.

It is preferred that the traveling determination unit be capable of determining acceleration and deceleration of a vehicle and that the weighting unit weight the second radio wave signal based on acceleration/deceleration dependency.

It is preferred that when a tire position of a tire of a specific ID is not specified, leaving candidate tires, and when a tire position of a tire of another ID is specified, the position determination unit delete the specified tire from the candidate tires and narrow down or specify a correct tire.

It is preferred that the position determination unit statistically determine variance of the axle rotation information of the axles as the relative evaluation to determine tire positions of the tires.

It is preferred that the position determination unit relatively evaluate variance of the axle rotation information of the axles and rank the axles to determine tire positions of the tires.

It is preferred that the receiver include an information storage that holds one or more pieces of specific position information indicating a time at which the tire pressure transmitter reached a specific position on a rotation path of the tire, that the transmission controller transmit the second radio wave signal including an ID and the one or more pieces of specific position information held in the second time period, and that the position determination unit calculate, based on the specific position information that is received by the receiver, axle rotation information at a point of time when the tire pressure transmitter previously reached a specific position and determine tire positions of the tires using the calculated axle rotation information.

Effect of the Invention

The present invention allows for accurate tire position determination within a short period of time.

BRIEF DESCRIPTION OF THE DRAWINGS

FIG. 4 is a diagram showing a sampling logic of the centripetal component of gravity.
FIG. 5 is a distribution chart showing axle rotation information (pulse count value) of tires of a certain ID.
FIG. 9 is a diagram showing a vehicle speed determination logic.
FIG. 10 is a table showing the relationship of the vehicle speed and a weighting coefficient.
FIG. 13 is a table showing a tire position determination logic in a third embodiment.
FIG. 14 is a table showing a determination logic for narrowing down candidate wheels.

FIRST EMBODIMENT

One embodiment of a tire position determination system will now be described with reference to FIGS. 1 to 7.

Figure 1:
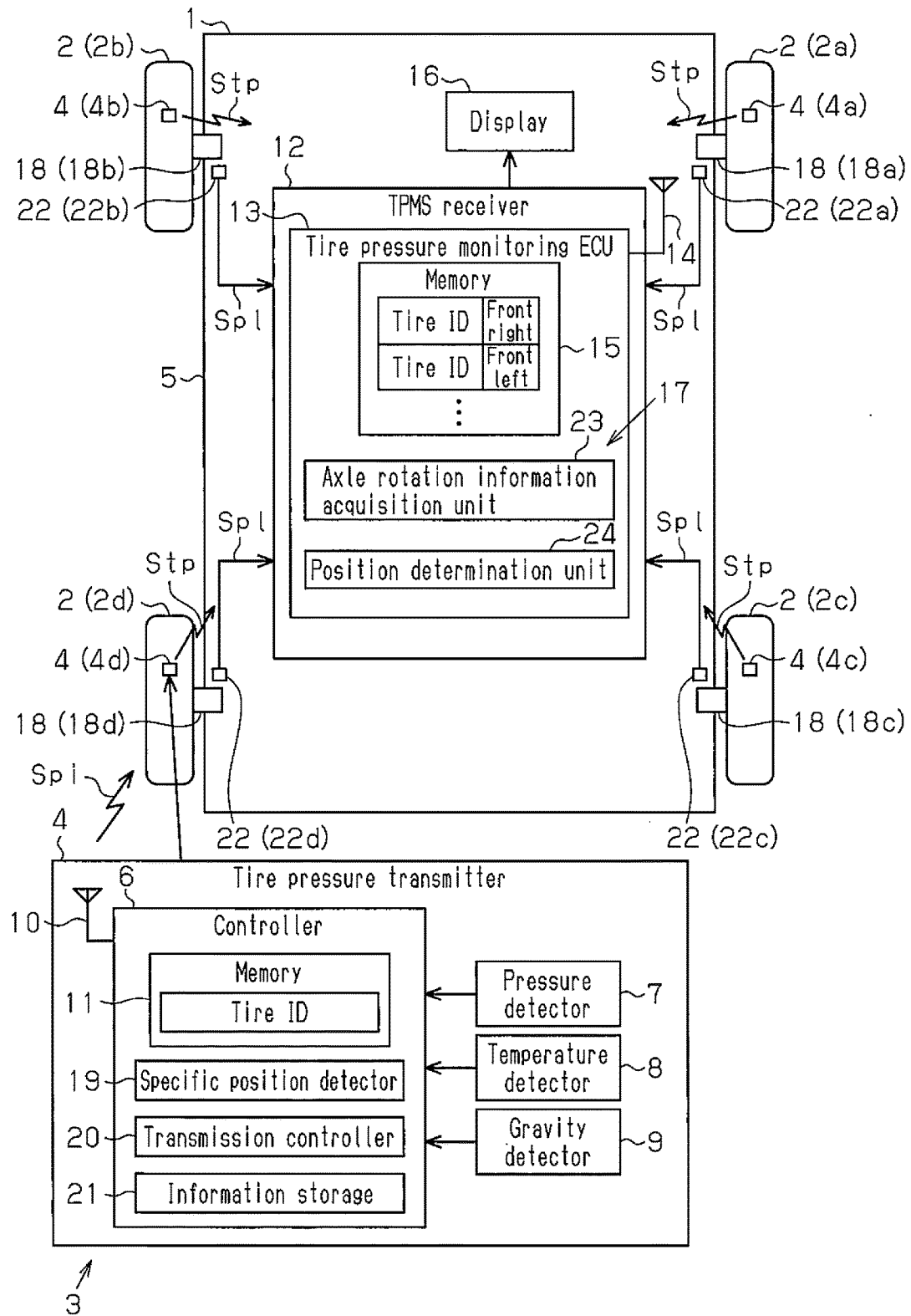
FIG. 1 is a diagram showing a first embodiment of a tire position determination system.

As shown in FIG. 1, a vehicle 1 includes a tire pressure monitoring system 3 (TPMS) that monitors the air pressure and the like of tires 2 (2a to 2d). The tire pressure monitoring systems 3 include tire pressure transmitters 4 (4a to 4d, also referred to as tire valves), which are respectively coupled to the tires 2a to 2d. The tire pressure transmitters 4 transmit to a vehicle body 5 a first radio wave signal that includes at least an ID and pressure data associated with the ID. Thus, the pressure of each of the tires 2a to 2d is monitored in the vehicle body 5. In one example, the first radio wave signal is a tire pressure signal Stp.

Each of the tire pressure transmitters 4 includes a controller 6 that controls operation of the tire pressure transmitter 4, a pressure detector 7 that detects tire pressure, a temperature detector 8 that detects the temperature of the tire 2, a gravity detector 9 that detects the gravity generated at the tire pressure transmitter 4, and a transmission antenna 10 that enables transmission of a radio wave signal. The controller 6 includes a memory 11 that stores a tire ID (valve ID) as an ID unique to the tire pressure transmitter 4. It is preferred that the pressure detector 7 be, for example, a pressure sensor. It is preferred that the temperature detector 8 be, for example, a temperature sensor. It is preferred that the gravity detector 9 be an acceleration sensor (G-sensor). It is preferred that the transmission antenna 10 be capable of, for example, transmitting a radio wave signal in the ultra-high-frequency (UHF) band.

The vehicle body 5 includes a receiver 12 (hereinafter referred to as TPMS receiver 12) that receives the tire pressure signal Stp from each of the tire pressure transmitters 4a to 4d to monitor the pressure of each of the tires 2a to 2d. The TPMS receiver 12 includes a tire pressure monitoring electronic control unit (ECU) 13 that controls operation of the TPMS receiver 12 and a reception antenna 14 that enables the reception of a radio wave signal. The tire pressure monitoring ECU 13 includes a memory 15 that stores IDs (tire IDs) of the tire pressure transmitters 4a to 4d associated with tire positions. In this example, the ID of the front right tire pressure transmitter 4a is referred to as "ID1," the ID of the front left tire pressure transmitter 4b is referred to as "ID2," the ID of the rear right tire pressure transmitter 4c is referred to as "ID3," and the ID of the rear left tire pressure transmitter 4d is referred to as "ID4." A display 16, which is arranged in, for example, an instrument panel in the passenger compartment, is connected to the TPMS receiver 12.

Each tire pressure transmitter 4 transmits the tire pressure signal Stp from the transmission antenna 10 at predetermined time intervals regularly or irregularly or when detecting rotation of the tires 2 with the gravity detector 9. For example, it is preferred that the tire pressure signal Stp be a signal including, for example, a tire ID, pressure data, and temperature data.

When the reception antenna 14 receives the tire pressure signal Stp from each of the tire pressure transmitters 4a to 4d, the TPMS receiver 12 verifies the tire ID in the tire pressure signal. When the tire ID is verified, the TPMS receiver 12 checks the pressure data of the tire pressure signal Stp. When the pressure data is less than or equal to a low-pressure threshold value, the TPMS receiver 12 shows on the display 16 that the pressure of the corresponding tire is low in association with the tire position. The TPMS receiver 12 performs the tire pressure determination on each tire pressure signal Stp that is received to monitor the pressure of each of the tires 2a to 2d.

The TPMS receiver 12 includes a tire position determination function (tire position determination system 17) that automatically determines the position (front, rear, left, or right) on the vehicle body 5 where each of the tires 2a to 2d is coupled, that is, performs auto-location. When detecting that the tire pressure transmitters 4a to 4d have reached specific positions on a rotation path of the corresponding tires, the tire position determination system 17 obtains the rotation position (rotation amount) of each of the axles 18 (18a to 18d) a number of times, determines whether or not the tire of each tire ID is rotating in synchronism with the rotation position (rotation amount) of each of the axles 18a to 18d, and associates the plurality of tire IDs with the axles 18a to 18d. This determines the positions of the tires 2a to 2d.

Figure 2:
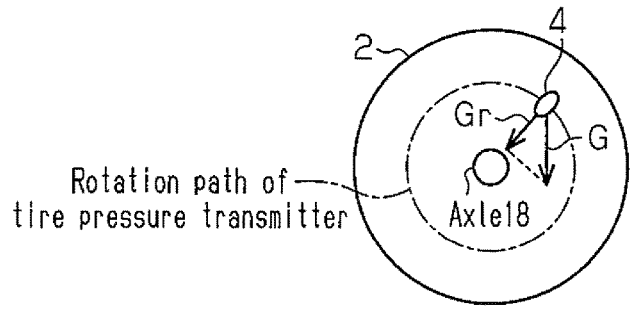
FIG. 2 is a diagram showing a centripetal component of gravity that is detected by a transmitter.

FIG. 2 shows a centripetal component of gravity that is detected by the gravity detector 9. It is preferred that the gravity detector 9 detect a gravitational centripetal component Gr in the axle direction (tire radial direction) relative to gravity G as the gravity applied to the tire pressure transmitter 4. The gravitational centripetal component Gr is "−1G" or "+1G" as long as, for example, centrifugal force is not taken into account when the tire pressure transmitter 4 is located at the peak of the tire rotation path (twelve o'clock position or six o'clock position in the drawing). The detected gravitational centripetal component Gr may be a tangential component on the tire rotation path.

Figure 3A:
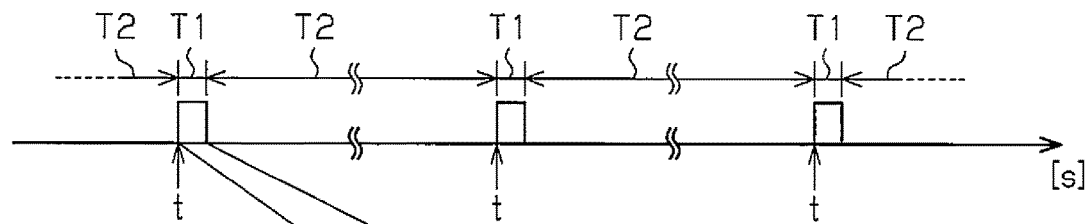
FIGS. 3A and 3B are communication sequence diagrams of the tire pressure transmitter.

FIG. 3A shows a radio wave transmission sequence of the tire pressure transmitter 4. During operation of the tire pressure transmitter 4, it is preferred that a first time period T1, during which transmission of a radio wave is allowed, and a second time period T2, during which the transmission of a radio wave is temporarily stopped, are alternately repeated. It is preferred that the first time period T1 be a short time, for example, one second. It is preferred that the second time period T2 be a long time, for example, thirty seconds. In this manner, the tire pressure transmitter 4 repeats the transmission of a radio wave signal during a limited time of one second in intervals of approximately thirty seconds.

As shown in FIG. 1, each tire pressure transmitter 4 includes a specific position detector 19 and a transmission controller 20. The specific position detector 19 detects when the tire pressure transmitter 4 has reached a specific position on the rotation path of the tire 2. The transmission controller 20 transmits a second radio wave signal (for example, ID radio wave signal Spi) that indicates that the tire 2 has reached the specific position. The second radio wave signal includes at least an ID (tire ID). It is preferred that the specific position detector 19 and the transmission controller 20 be arranged in, for example, the controller 6. It is preferred that the specific position be, for example, a peak position on the rotation path of a tire. It is preferred that the ID radio wave signal Spi be transmitted a number of times in accordance with, for example, the number of times the peak position is detected. The tire pressure transmitter 4 transmits the ID radio wave signal Spi in the first time period T1.

It is preferred that the tire pressure transmitter 4 include an information storage 21 that holds at least one piece of specific position information Dtm indicating the time at which the tire pressure transmitter 4 reached the specific position in the second time period T2. For example, when the vehicle 1 is traveling at a low speed and the tire 2 rotates slowly, the peak position may not be detected a predetermined number of times in the first time period T1, which is relatively short. Thus, the tire pressure transmitter 4 detects the peak position in advance in the second time period T2, during which radio wave transmission is temporarily stopped. Further, for example, when a radio wave signal is transmitted only at a specific tire angle and the radio wave signal has a null value, the radio wave signal may be subsequently fixed to the null value. Taking this into account, the tire pressure transmitter 4 transmits a radio wave signal at an arbitrary tire angle. In this method, a radio wave signal is not fixed to a null value. That is, the risk of greatly decreasing the reception rate of the TPMS receiver 12 is avoided when tire positions are determined.

It is preferred that the specific position information Dtm be peak information indicating the time at which the tire pressure transmitter 4 has reached a peak position. The specific position information Dtm includes, for example, the number of gravity sampling points that indicates the number of times gravity sampling has been performed and a gravitation sampling interval time that is the interval at which gravity sampling is performed.

Figure 3B:
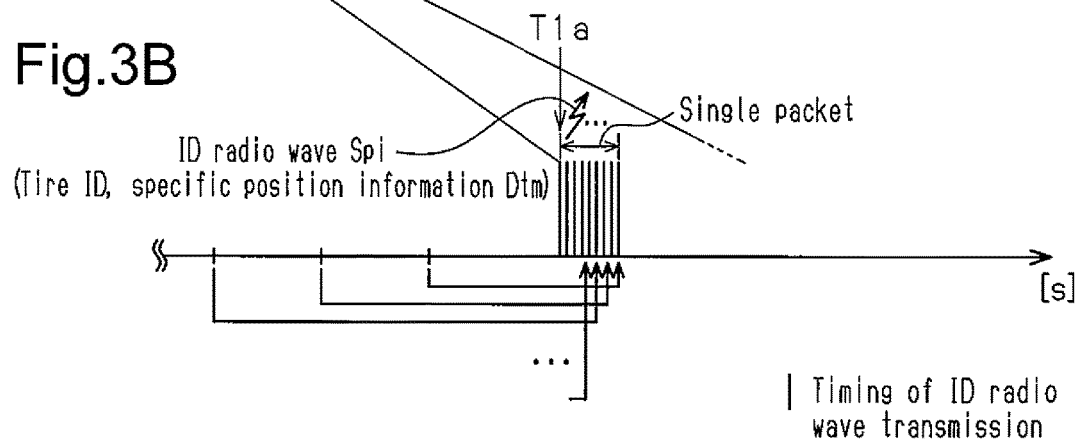

It is preferred that, as shown in FIG. 3B, the information storage 21 detect the peak position a predetermined number of times (for example, eight times) in the second time period T2 prior to a starting point T1a of the first time period T1. In the first time period T1, the transmission controller 20 transmits at least one piece of specific position information Dtm, which is held in the information storage 21, together with the ID (tire ID) as the second radio wave signal. In one example, the second radio wave signal is the ID radio wave signal Spi. To finish the transmission of the single packet of the ID radio wave signal Spi in the first time period T1, the transmission controller 20 may successively transmit the ID radio wave signals Spi. Each of the ID radio wave signals Spi may have a time length of, for example, approximately 10 ms and be transmitted repeatedly at intervals of approximately 100 ms.

As shown in FIG. 1, the TPMS receiver 12 includes an axle rotation information acquisition unit 23 and a position determination unit 24. The axle rotation information acquisition unit 23 receives the second radio wave signal (for example, ID radio wave signal Spi) and acquires axle rotation information Dc from the axle rotation detectors 22 (22a to 22d), which detect rotation of the corresponding axles 18a to 18d, whenever the tire pressure transmitters 4 reach the specific positions. The position determination unit 24 collects statistics on the axle rotation information Dc for each ID (tire ID) to calculate a distribution of the axle rotation information Dc for each ID (tire ID). Further, the position determination unit 24 determines the tire positions by specifying the tires (ID1 to ID4) that rotate in synchronism with the axles 18a to 18d based on the distribution of the axle rotation information Dc. It is preferred that the axle rotation information acquisition unit 23 and the position determination unit 24 be arranged in, for example, the tire pressure monitoring ECU 13. It is preferred that distribution be, for example, "variation," "average of deviation," or "standard deviation."

Each of the axle rotation detectors 22a to 22d may be, for example, an antilock brake system (ABS) sensor arranged in each of the axles 18a to 18d. The axle rotation information Dc is, for example, the number of pulses detected by the ABS sensor, that is, a pulse count value. Further, each of the axle rotation detectors 22a to 22d detects a plurality of, for example, forty-eight teeth arranged on the axles 18a to 18d to provide the TPMS receiver 12 with a pulse signal Spl, which has the form of a square wave. When the axle rotation information acquisition unit 23 detects both of a rising edge and a falling edge of the pulse signal Spl, the axle rotation information acquisition unit 23 detects ninety-six pulses (count value: zero to ninety-five) per tire rotation.

The position determination unit 24 treats each of a plurality of (eight in this example) ID radio wave signals Spi, which are received as one packet, as separate data. Whenever the position determination unit 24 receives the ID radio wave signal, the position determination unit 24 obtains the axle rotation information Dc of each of the axle rotation detectors 22a to 22d. The position determination unit 24 determines the position of each of the tires 2a to 2d by calculating the distribution of the axle rotation information Dc for each tire ID. Further, the position determination unit 24 back-calculates the axle rotation information Dc for each specific position, which is detected in the second time period T2 and held as the specific position information Dtm, and determines a tire position from the back-calculated value.

The operation of the tire position determination system 17 will now be described with reference to FIGS. 3 to 7.

As shown in FIG. 4, in the second time period T2, the tire pressure transmitter 4 first reads the centripetal component Gr of gravity a predetermined time before starting the peak detection and sets a gravity sampling interval time Ta, which is relatively long, in accordance with the read gravitational centripetal component Gr to check the waveform of the gravity. The tire pressure transmitter 4 starts preliminary gravity sampling that detects the gravitational centripetal component Gr in the gravity sampling interval time Ta.

In the preliminary gravity sampling, the tire pressure transmitter 4 first monitors where the peak is generated in the gravitational centripetal component Gr. When detecting the peak of the gravitational centripetal component Gr, the tire pressure transmitter 4 monitors the gravitational centripetal component Gr to locate the next peak and measure a single cycle of the preliminary gravity sampling. When detecting the peak of the gravitational centripetal component Gr again, the tire pressure transmitter 4 calculates the cycle of the preliminary gravity sampling based on the time between the former peak and the latter peak. The tire pressure transmitter 4 sets a gravity sampling interval time Tb, which is in accordance with the cycle of the preliminary gravity sampling, to the gravity sampling interval time used for actual gravity sampling. That is, since the number of gravity samplings per tire rotation is set to a specified value (for example, twelve), the optimal gravity sampling interval time Tb is set so that the number of times gravitational sampling is performed reaches the specified value when the actual gravity sampling is performed.

The tire pressure transmitter 4 performs actual gravity sampling in the gravity sampling interval time Tb. That is, the tire pressure transmitter 4 repeatedly detects the gravitational centripetal component Gr in the gravity sampling interval time Tb and detects peak positions for determining tire positions. In this example, a single cycle of the actual gravity sampling is set to Tr, which is the duration of a specified number of (for example, twelve) the gravity sampling interval time Tb.

When the information storage 21 detects a peak position through gravity sampling that is repeatedly performed during the gravity sampling interval time Tb, the information storage 21 stores the specific position information Dtm in the memory 11. Subsequently, the information storage 21 holds the specific position information Dtm in the memory 11 whenever detecting a peak.

As shown in FIG. 3, in the first time period T1, during which a radio wave can be transmitted, the transmission controller 20 transmits from the transmission antenna 10 at least one ID radio wave signal Spi that includes at least one piece of specific position information Dtm, which is held in the memory 11. The ID radio wave signal Spi includes at least a tire ID and the specific position information Dtm. It is preferred that the ID radio wave signal Spi include, for example, a tire ID, the number of gravity sampling points, and the gravity sampling interval time Tb. The number of gravity sampling points corresponds to the (total) number of times that gravity sampling is performed in the gravity sampling interval time Tb. The ID radio wave signals Spi may be successively transmitted in short intervals of, for example, approximately 100 ms, so that the radio wave signal Spi is entirely transmitted in the first time period T1.

Referring to FIG. 5, whenever the position determination unit 24 receives the ID radio wave signal Spi, the position determination unit 24 obtains the axle rotation information Dc of each of the axle rotation detectors 22a to 22d. In this example, the position determination unit 24 back-calculates the axle rotation information Dc from each piece of the specific position information Dtm (peak position). Further, the position determination unit 24 determines a tire position by collecting statistics of the back-calculated axle rotation information Dc and updating the statistics of the axle rotation information Dc whenever the position determination unit 24 receives a packet of the ID radio wave signal Spi. For example, as shown in FIG. 5, when the position determination unit 24 cannot specify a tire position from the distribution of the axle rotation information Dc calculated from the ID radio wave signal in the first packet, the position determination unit 24 updates the distribution of the axle rotation information Dc based on the ID radio wave signal Spi of the second packet to specify the tire position from the updated distribution. Nevertheless, when the position determination unit 24 cannot be specified, the position determination unit 24 repeats the same process on the third and following packets to update the distribution and determines the tire position from the newly updated distribution.

Figures 6, 7:
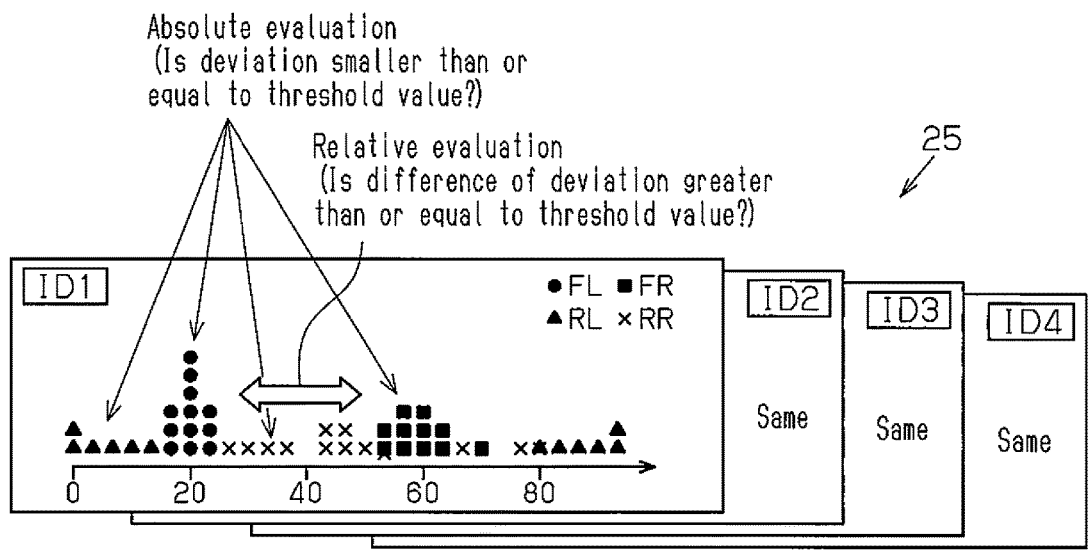
FIG. 6 is a distribution chart showing axle rotation information (pulse count value) for IDs.
FIG. 7 shows equations for calculating deviation and standard deviation.

FIG. 6 shows an example of the tire position determination. The position determination unit 24 generates a distribution chart 25 for each tire ID as shown in FIG. 6. It is preferred that the position determination unit 24 perform absolute evaluation, which determines the validity of the distribution using only the axle rotation information Dc of each axle 18, and relative evaluation, which determines the validity of the distribution using the axle rotation information Dc of a plurality of axles 18, to determine a tire position based on the result of the absolute evaluation and the result of the relative evaluation. In the relative evaluation, the position determination unit 24 determines whether or not the subject tire has sufficient synchronization when compared to other tires. Examples of distribution include "average of deviation" and "standard deviation." A value indicating a distribution includes the average of deviation or the value of standard deviation. The average of deviation and the value of standard deviation decrease the better the determination result becomes. For example, the position determination unit 24 determines whether or not a value indicating the distribution of the axle rotation information of each of the axles 18 in absolute evaluation is smaller than a first threshold value and determines whether or not the difference of values indicating the distribution of the axle rotation information of the axles 18 in relative evaluation is larger than a second threshold value.

Referring to FIG. 7, when a pulse count value is "x" and the total number of collected pulse count values is "n," the average of deviation is calculated from equation ($\alpha$) in FIG. 7. The standard deviation is calculated from equation ($\beta$) in FIG. 7. In the following specification, the "average of deviation" and the "standard deviation" are referred to as a "deviated value." In absolute evaluation, the position determination unit 24 determines whether or not the deviated value is smaller than or equal to the threshold value. In relative evaluation, the position determination unit 24 calculates the difference of the deviated values between an evaluated tire and other tires to determine whether or not the difference of the deviated value is greater than or equal to the threshold value, that is, whether or not the deviated value of the evaluated tire of absolute evaluation is sufficiently smaller than the deviated values of other tires. When the deviated value is smaller than or equal to the threshold value in absolute evaluation and the difference of the deviated values is greater than or equal to the threshold value in relative evaluation, the position determination unit 24 recognizes that the axle 18 is rotated in synchronism with the tire 2 and specifies the tire position.

In the example of FIG. 6, with regards to ID1, the pulse count values of the front left axle 18*b* concentrate around "20." In such a case, the deviated value of the front left axle 18*b* is less than or equal to the threshold value, and the front left axle 18*b* satisfies the absolute evaluation for ID1. However, the pulse count values of the front right axle 18*a*, the rear right axle 18*c*, and the rear left axle 18*d* do not respectively converge at a single value for ID1, and these deviated values are unsatisfactory. Since the difference between the deviated value of the front left axle 18*b* and the deviated values of the other axles is greater than or equal to the threshold value, the relative evaluation is also satisfied. Thus, the position determination unit 24 determines that the front left axle 18*b* is rotated in synchronism with the tire 2 of ID1. In the same manner, the positions of the tires of ID2 to ID4 are determined.

When the position determination unit 24 cannot specify the positions of the four tires 2 through a single determination, the position determination unit 24 repeats the same process until the positions of the four tires 2 are all specified. When specifying the positions of all four tires 2, the position determination unit 24 writes the determination result to the memory 15 and updates the tire positions. The tire position determination process may be performed whenever, for example, an ignition switch of the vehicle 1 is turned on.

The present embodiment has the advantages described below.

(1) Each tire pressure transmitter 4 transmits to the TPMS receiver 12 the ID radio wave signal Spi indicating that the tire pressure transmitter 4 has reached a peak position in the tire rotation path. Whenever receiving the ID radio wave signal Spi from each tire pressure transmitter 4, the TPMS receiver 12 obtains the axle rotation information Dc of each of the axles 18*a* to 18*d* and generates statistical data of the axle rotation information Dc for each of ID1 to ID4. The TPMS receiver 12 generates distribution data of the axle rotation information Dc for each of ID1 to ID4 to determine the tire positions from the distribution data. In this manner, many tire positions are determined within a short period of time. This allows for accurate determination of tire positions within a short period of time.

(2) In the operation of the tire pressure transmitter 4, the first time period T1, during which radio wave signals can be transmitted, and the second time period T2, during which radio wave transmission is temporarily stopped, are alternately repeated, and the ID radio wave signal Spi is transmitted in the first time period T1. This shortens the time the tire pressure transmitter 4 transmits radio waves and is advantageous for extending the life of a battery of the tire pressure transmitter 4.

(3) The position determination unit 24 determines a tire ID and an axle 18 that satisfy both of the absolute evaluation and the relative evaluation as a correct combination. Thus, when determining tire positions, the absolute evaluation is checked in combination with the relative evaluation. This is further advantageous for ensuring the accuracy of tire position determination.

(4) The tire pressure transmitter 4 performs peak detection in advance in the second time period T2, during which radio waves are not transmitted, and obtains a number of specific position information Dtm in advance by holding in the memory 11 the specific position information Dtm that indicates the time when the tire pressure transmitter 4 reached the peak position. In the first time period T1, during which wave radio can be transmitted, the tire pressure transmitter 4 transmits the plural pieces of held specific position information Dtm together with the ID to the TPMS receiver 12 as ID radio wave signal Spi. In such a case, when the specific position information Dtm is separately transmitted, the information is successively transmitted in short intervals of, for example, approximately 100 ms. Thus, even in the first time period T1 that allows the tire pressure transmitter 4 to transmit radio wave signals, the peak is detected in advance in the second time period T2, during which radio wave transmission is temporarily stopped. Accordingly, the data for determining tire positions are all collected. Since the amount of data used for tire position determination can be sufficiently ensured, this is further advantageous for ensuring accurate tire position determination.

SECOND EMBODIMENT

A second embodiment will now be described with reference to FIGS. 8 to 12. In the second embodiment, the tire position determination method of the first embodiment is modified. Thus, like or same reference numerals are given to those components that are the same as the corresponding components of the first embodiment. The description centers on parts differing from the first embodiment.

Figure 8:
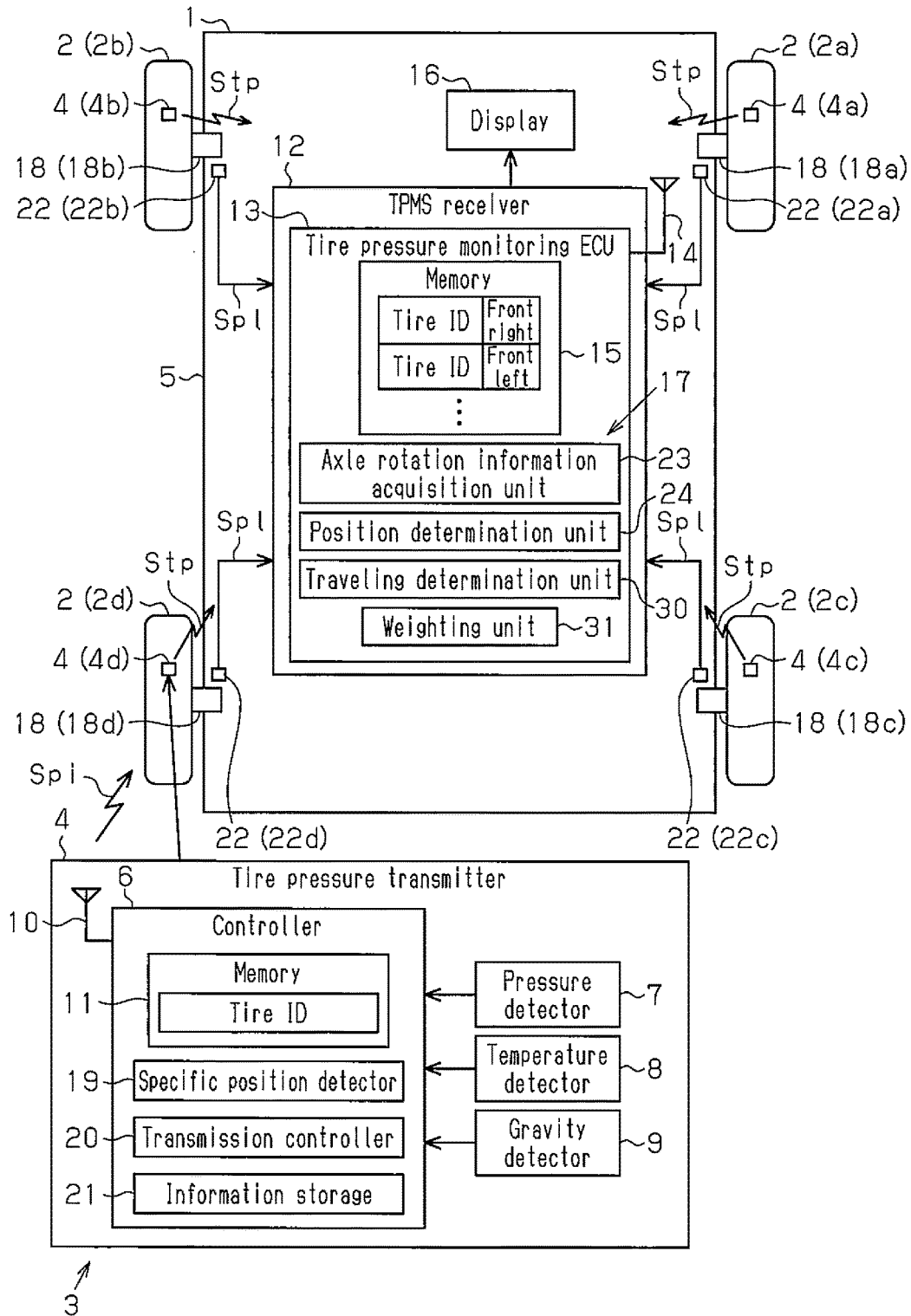
FIG. 8 is a diagram showing a second embodiment of a tire position determination system.

It is preferred that the TPMS receiver 12 include, as shown in FIG. 8, a traveling determination unit 30 that determines a traveling state of the vehicle 1 and a weighting unit 31 that weights the second radio wave signal received by the TPMS receiver 12 based on a detection result of the traveling determination unit 30. In one example, the second radio wave signal is an ID radio wave signal Spi. It is preferred that the traveling determination unit 30 and the weighting unit 31 be arranged in, for example, the tire pressure monitoring ECU 13. It is preferred that the traveling determination unit 30 determine a traveling state of the vehicle 1 from changes in the increase and decrease of the axle rotation information Dc. It is preferred that the weighting unit 31 weight (add weighting coefficient K) the ID radio wave signal Spi in accordance with the traveling state of the vehicle 1. It is preferred that the position determination unit 24 collect statistics using the weighted axle rotation information Dc and determine tire positions based on the distribution that is obtained from the statistics.

Operation when Vehicle is Traveling at Constant Speed

It is preferred that, as shown in FIG. 9, the traveling determination unit 30 perform "determination of vehicle speed" and "determination of constant speed" from the change in the axle rotation information Dc (pulse count value) that is output from the axle rotation detector 22. It is preferred that the determination of a vehicle speed and a constant speed be performed for each of the axles 18*a* to 18*d*. For example, the traveling determination unit 30 determines the vehicle speed from the change in the axle rotation information Dc (pulse count value) per tire rotation in a time period that is one cycle prior to when a peak is detected. For example, the vehicle speed when the first peak is detected is calculated based on a pulse change from one cycle prior to the peak detection.

Further, the traveling determination unit 30 determines whether or not the vehicle speed is constant from the difference in vehicle speed between two successive sampling cycles. For example, the traveling determination unit 30 determines whether or not the vehicle speed of a peak detection of a predetermined time is constant by comparing the vehicle speed of a time period two cycles prior to a predetermined nth peak detection (first vehicle speed) and the vehicle speed of a time period one cycle prior to the predetermined nth peak detection (second vehicle speed). More specifically, the traveling determination unit 30 determines whether or not the vehicle speed of the first peak detection is constant by calculating the difference between the vehicle speed two cycles prior to the first peak detection and the vehicle speed one cycle prior to the first peak detection. Further, the traveling determination unit 30 determines whether or not the vehicle speed of the second peak detection is constant by calculating the difference between the vehicle speed two cycles prior to the second peak detection and the vehicle speed one cycle prior to the second peak detection. Such a determination is performed in the same manner for the third and subsequent peaks.

It is preferred that, as shown in FIG. 10, the weighting unit 31 perform weighting taking into account the speed dependency of the axle rotation information Dc for each of the axle rotation detectors 22a to 22d that are obtained when a certain ID is received. For example, when the vehicle speed is "0 to V1," the weighting unit 31 reflects a weighting coefficient K1 to the read pulse count value. When the vehicle speed is "V1 to V2," the weighting unit 31 reflects a weighting coefficient K2 (<K1) to the read pulse count value (V1<V2).

Further, the weighting unit 31 may weight a received ID radio wave signal Spi when the vehicle 1 travels at a constant speed. A relatively large weighting may be set for weighting coefficients K1α and K2α that are used when the vehicle 1 is traveling at a constant speed. Since the tire pressure transmitter 4 uses the gravity detector 9 to detect gravity, tire positions are accurately detected because the sinusoidal detected waveform of a gravitational centripetal component when the vehicle 1 is traveling at a constant speed allows for easy detection of the peak and the tire 2 undergoes a single rotation in the determined gravity sampling cycle. When the vehicle 1 is traveling at a constant speed that is low, the weighting may be increased. This is because variations in the peak position are small when the vehicle 1 is traveling at the low speed, and tire positions are detected with further accuracy. Here, "K1α and K2α" may be set to be larger than "K1 and K2."

Using the axle rotation information Dc weighted in accordance with speed (constant speed traveling) in such a manner, the position determination unit 24 collects statistics for each of ID1 to Id4 and calculates the distribution of the axle rotation information Dc of each of the axles 18a to 18d for ID1 to ID4. The position determination unit 24 adds accuracy data to the axle rotation information Dc to determine tire positions from the distribution that allows for further correct determination. This allows for correct determination of tire positions.

Operation when Vehicle is Accelerating or Decelerating

Figures 11, 12:
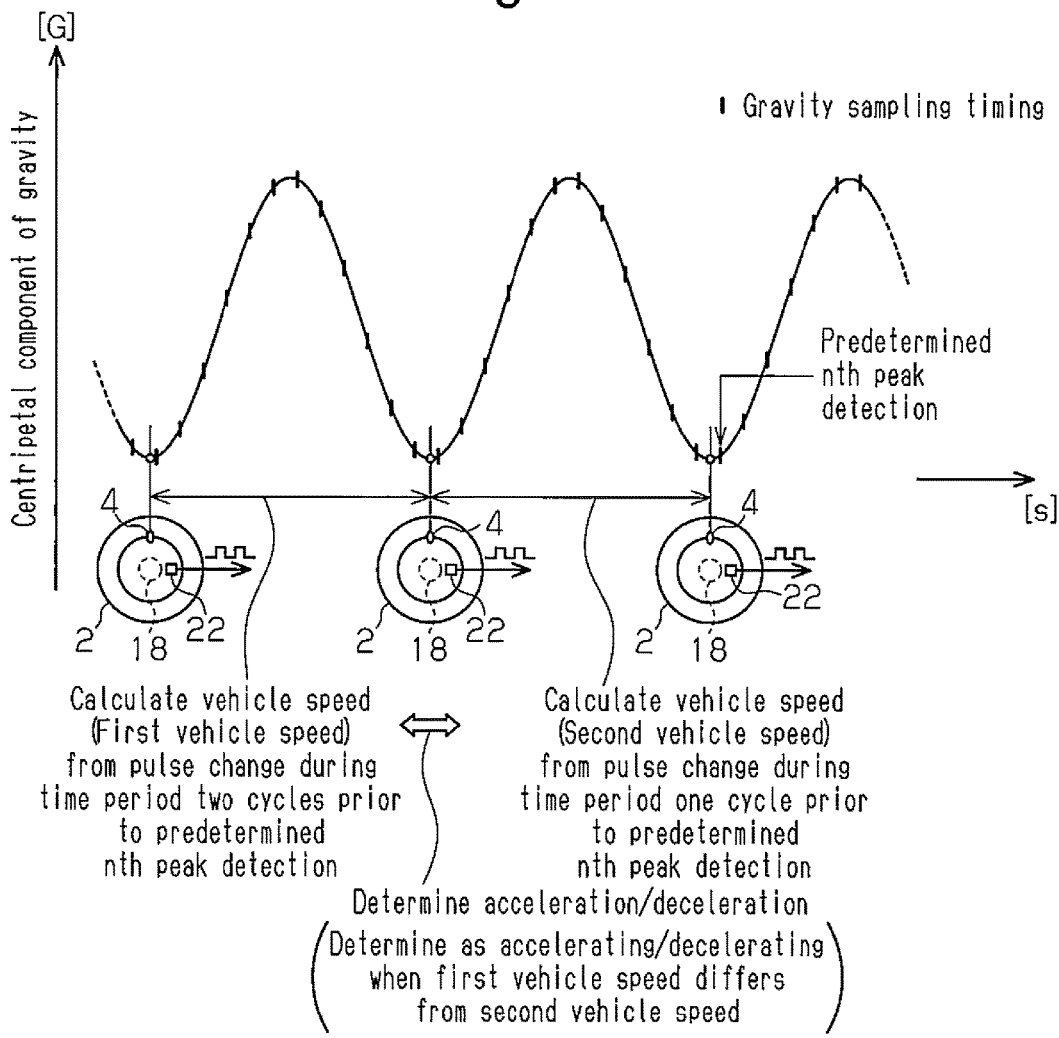
FIG. 11 is a diagram showing an acceleration/deceleration determination logic.
FIG. 12 is a table showing the relationship of acceleration/deceleration and weighting.
Figure 15A:
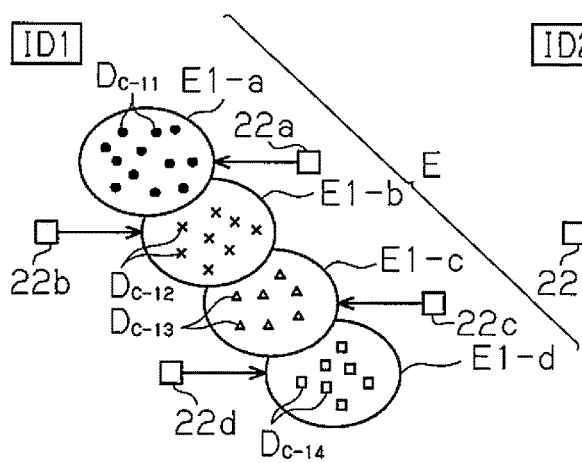
FIGS. 15A-15D are schematic diagrams showing populations that are estimated from valve IDs in a fourth embodiment.
Figure 15B:
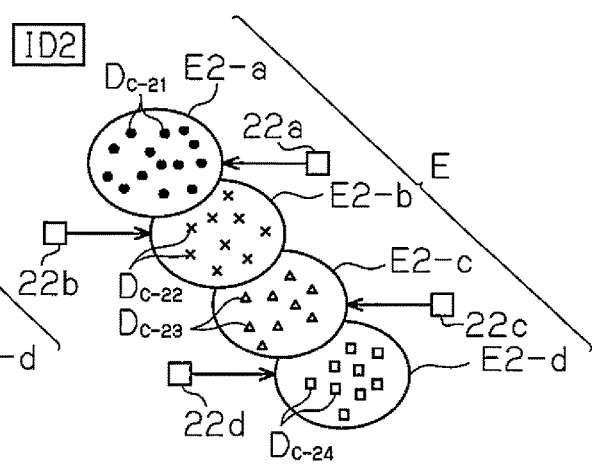
Figure 15C:
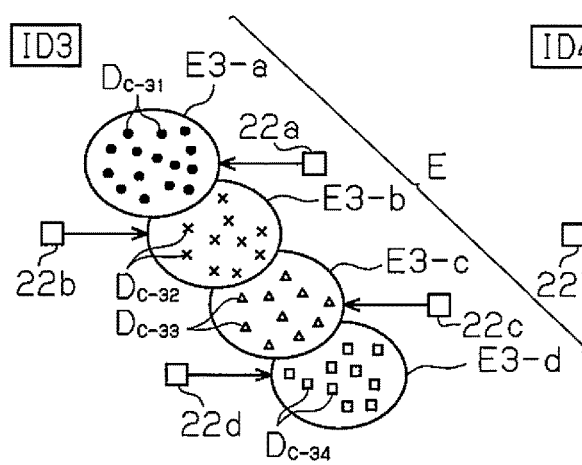
Figure 15D:
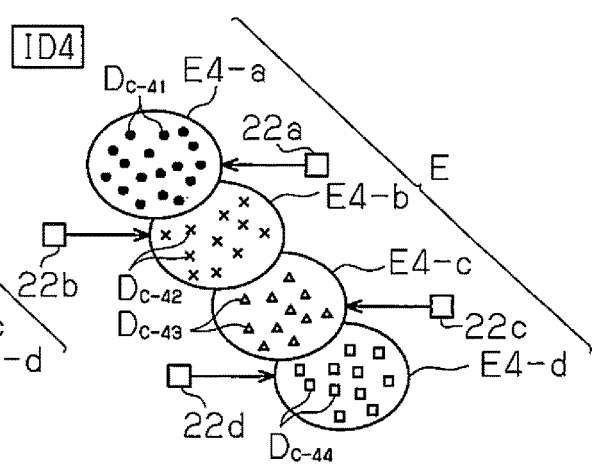

It is preferred that, as shown in FIG. 11, the traveling determination unit 30 determine whether the vehicle 1 is accelerating or decelerating from the change in the axle rotation information Dc (pulse count value) provided by the axle rotation detector 22. It is preferred that the determination of acceleration/deceleration be performed for each of the axles 18a to 18d. The traveling determination unit 30 determines whether the vehicle 1 is accelerating or decelerating from the difference in vehicle speed between two successive sampling periods. For example, the traveling determination unit 30 determines whether or not a vehicle speed of a peak detection of a predetermined time is constant by comparing a vehicle speed of a time period two cycles prior to the predetermined nth peak detection (first vehicle speed) and a vehicle speed of a time period one cycle prior to the predetermined nth peak detection (second vehicle speed). More specifically, the traveling determination unit 30 determines whether the vehicle 1 is accelerating or decelerating during the first peak detection by calculating the difference between the vehicle speed two cycles prior to the first peak detection and the vehicle speed one cycle prior to the first peak detection. Further, the traveling determination unit 30 determines whether the vehicle 1 is accelerating or decelerating during the second peak detection by calculating the difference between the vehicle speed two cycles prior to the second peak detection and the vehicle speed one cycle prior to the second peak detection. Such a determination is performed in the same manner for the third and subsequent peaks. The traveling determination unit 30 determines that the vehicle 1 is accelerating when the first vehicle speed is smaller than the second vehicle speed and determines that the vehicle 1 is decelerating when the first vehicle speed is greater than the second vehicle speed.

It is preferred that, as shown in FIG. 12, the weighting unit 31 perform weighting taking into account the acceleration/deceleration dependency of the axle rotation information Dc for each of the axle rotation detectors 22a to 22d obtained when a certain ID is received. This is because the gravity sampling timing is deviated since the tire 2 rotates once before a single cycle of the gravity sampling is completed when the vehicle 1 accelerates during peak monitoring as a result of the gravity sampling period of the gravitational centripetal component Gr set in advance of the peak detection, that is, the gravity sampling interval time, which is the interval at which gravity sampling is performed, being constant during sampling. The same applies to when the vehicle 1 is decelerating. Thus, the axle rotation information Dc obtained when the vehicle 1 is accelerating or decelerating is determined as unsatisfactory data and then processed. It is preferred that the weighting unit 31 do not weight the received ID radio wave signal Spi when the vehicle 1 is accelerating or decelerating. Further, the received ID radio wave signal Spi may be deleted when the vehicle 1 is accelerating or decelerating or when the acceleration or deceleration is a specified value or greater.

The position determination unit 24 collects statistics for each of ID1 to ID4 using the axle rotation information Dc that is weighted in accordance with the acceleration/deceleration of the vehicle 1 and calculates the distribution of the axle rotation information Dc of each of the axles 18a to 18d for ID1 to ID4. The position determination unit 24 adds accuracy information to the data of the axle rotation information Dc and determines tire positions from the distribution that allows for further correct determination. This allows for correct determination of tire positions.

In addition to advantages (1) to (4) of the first embodiment, the structure of the second embodiment has the advantages described below.

(5) The TPMS receiver 12 uses the traveling determination unit 30 to acknowledge the current traveling state and weights the ID radio wave signal Spi in accordance with a traveling state. Thus, in a traveling state in which accurate statistics can be collected, a large weight is assigned to the ID radio wave signal so that accuracy information is added to the statistics of the axle rotation information Dc. This allows accuracy information to be added to the statistics of the axle rotation information Dc. That is, the distribution of the axle rotation information of each of the axles 18a to 18d for each tire ID is accurately calculated. This is further advantageous for ensuring accurate tire position determination.

(6) Weighting may be performed in accordance with the speed dependency of the vehicle 1. In such a case, even if the speed of the vehicle 1 changes, tire positions can be accurately determined.

(7) Weighting may be performed in accordance with the acceleration/deceleration dependency of the vehicle 1. In such a case, even if the speed of the vehicle 1 accelerates or decelerates, tire positions can be accurately determined.

THIRD EMBODIMENT

A third embodiment will now be described with reference to FIGS. 13 and 14. The description centers on parts differing from the first and second embodiments.

As shown in FIG. 13, when one of the four wheels is determined in tire position determination, a plurality of candidates may exist. For example, when only one of absolute evaluation and relative evaluation is satisfied or when the absolute evaluation and relative evaluation is close to satisfying the threshold value, the tire is determined as a candidate. FIG. 13 shows an example in which the tire of ID1 is determined as not being the correct wheel for the rear right axle 18c and the rear left axle 18d, and the front right axle 18a and the front left axle 18b ultimately cannot be determined. In FIG. 13, the tire of ID2 is specified as the tire of the front left axle 18b.

As shown in FIG. 14, the position determination unit 24 eliminates the axles 18 for which tire positions are specified from the candidates. In FIG. 14, since the tire of ID2 is determined as the tire of the front left axle 18b, the front left axle 18b is eliminated from the candidates for the tire position determination. Thus, when the tire position of ID1 is determined, the front left axle 18b is eliminated from the remaining two candidates, namely, the front right axle 18a and the front left axle 18b. This allows the position determination unit 24 to associate ID1 with the front right axle 18a and to determine the tire of ID1 as the front right tire 2a.

In addition to advantages (1) to (7) of the first and second embodiments, the structure of the third embodiment has the advantage described below.

(8) When the tire position determination is performed, even if a plurality of candidate tires 2 associated with a certain tire ID, that is, a plurality of candidate wheels remain, the determination results of the other tire IDs are used to narrow down the candidate wheels. This is further advantageous for reducing the time for specifying tire positions.

FOURTH EMBODIMENT

A fourth embodiment will now be described with reference to FIGS. 15 to 17. In the fourth embodiment, tire positions are determined from how a plurality of axle rotation information varies through relative evaluation that determines the validity of a distribution between the plurality of axle rotation information. The description centers on parts differing from the first to third embodiments.

As shown in FIG. 15, the tire position determination system 17 of this example determines tire positions by estimating a population E of each of the valve IDs (ID1 to ID4) from the axle rotation information Dc obtained by each of the axle rotation detectors 22a to 22d for each of the valve IDs, that is, a group of limited data that includes variation, and by checking the ones of the tires 2a to 2d and the ones of the axles 18a to 18d that are synchronized with each other. In this example, ID1 includes populations E1-a, E1-b, E1-c, and E1-d, ID2 includes populations E2-a, E2-b, E2-c, and E2-d, ID3 includes populations E3-a, E3-b, E3-c, and E3-d, and ID4 includes populations E4-a, E4-b, E4-c, and E4-d. Population E1-a includes a group of axle rotation information Dc-11, population E1-b includes axle rotation information Dc-12, population E1-c includes axle rotation information Dc-13, and population E1-d includes axle rotation information Dc-14. In the same manner, populations E2-a to E2-d respectively include axle rotation information Dc-21 to Dc-24, populations E3-a to E3-d respectively include axle rotation information Dc-31 to Dc-34, and populations E4-a to E4-d respectively include axle rotation information Dc-41 to Dc-44.

When the variance V of the axle rotation information Dc is a value in which the root is omitted from equation β in FIG. 7, the distribution of the encircled axle rotation information Dc that is synchronized in population variance σ has a small variance V. However, when the tire having a small variance V is simply determined as a correct wheel in this example in which the axle rotation information Dc is limited, an incorrect determination may be performed. Although evaluation should be ideally performed with population variance σ having an infinite amount of data, one measure or another is necessary in this example since the amount of data is limited.

Figure 16:
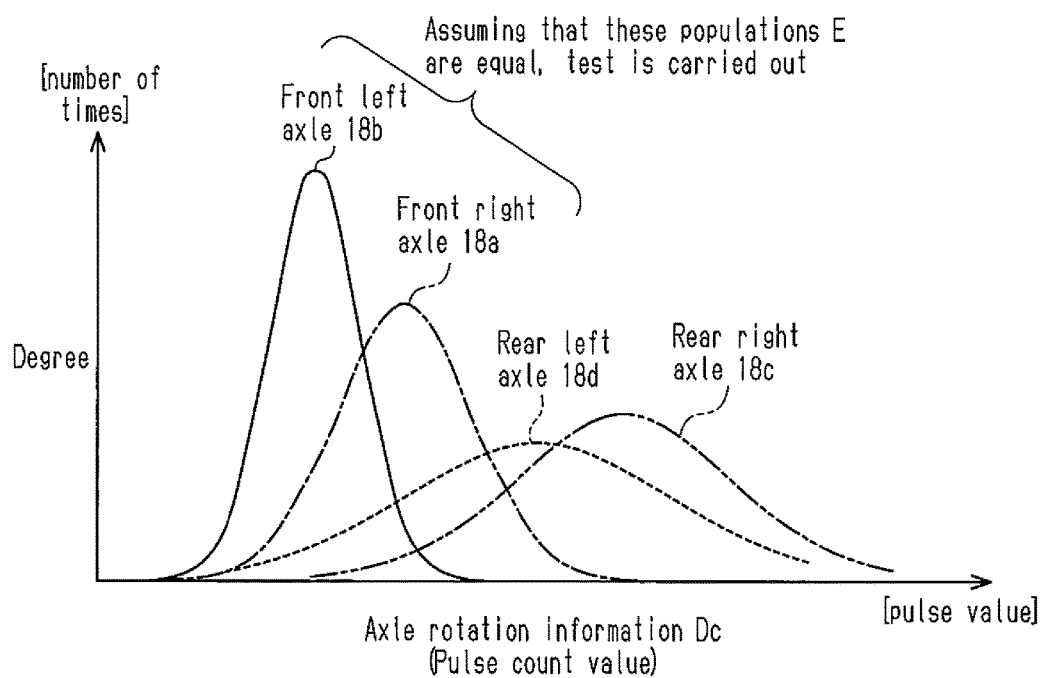
FIG. 16 is a distribution graph showing axle rotation information of a certain valve ID.

It is preferred that, as shown in FIG. 16, the position determination unit 24 of this example specify tire positions by statistically determining the variance V as relative evaluation. For example, the position determination unit 24 specifies tire positions by assuming that the axle rotation information Dc having the smallest variance V is equal to the axle rotation information Dc having the second smallest variance V and by performing the determination. In the example of FIG. 16, the position determination unit 24 assumes that population variance σ of the axle rotation information Dc-22 of the front left axle 18b having the smallest variance V is equal to population variance σ of the axle rotation information Dc-21 of the front right axle 18a having the second smallest variance V in the distribution of the axle rotation information Dc-21 to Dc-24 in ID2 to perform the determination.

The determination is carried out using equation (1) described below.

[Equation 1]

$$F = \frac{v_{FR}/\sigma_{FR}}{v_{FL}/\sigma_{FL}} \tag{1}$$

In equation 1, variance V is "$V_{FR}$" and population variance σ is "$\sigma_{FR}$" in the axle rotation information Dc-21 of the front right axle 18a, and variance V is "$V_{FL}$" and population variance σ is "$\sigma_{FL}$" in the axle rotation information Dc-22 of the front left axle 18b. In the determination, since it is postulated that population variance σ is equal, $\sigma_{FL}$ is equal to $\sigma_{FR}$.

Figure 17:
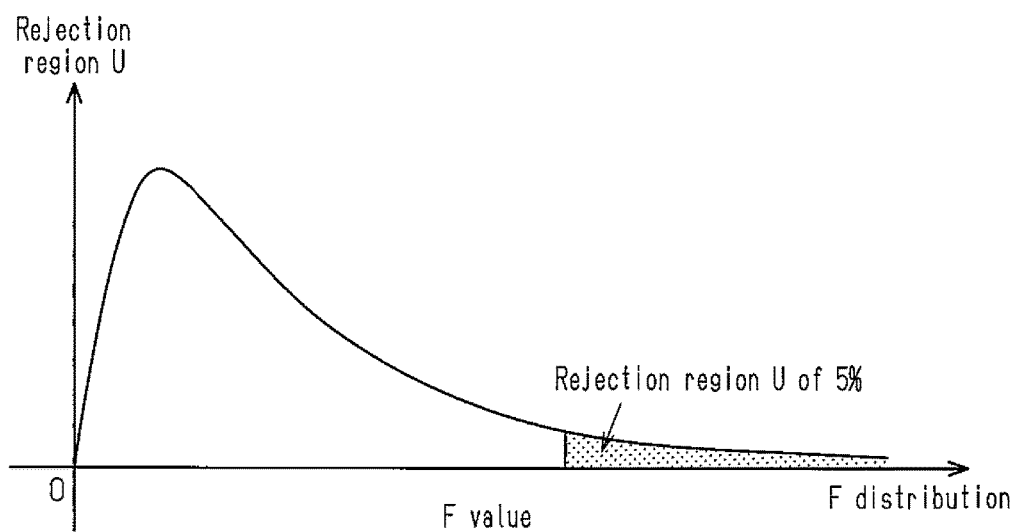
FIG. 17 is an F-distribution graph of variance.

As shown in FIG. 17, for example, the amount of data of the axle rotation information Dc of the front left axle 18b is "$N_{FL}$" and the degree of freedom of the F-distribution is "$\phi_{FL}$", and the amount of data of the axle rotation information Dc of the front right axle 18a is "$N_{FR}$," and the degree of freedom of the F-distribution is "$\phi_{FR}$". In this case, the value of equation (1) follows the distribution of F ($\phi_{FL}$, $\phi_{FR}$). When the value of equation (1) is greater than or equal to a rejection region U, the above postulation that population variance σ is equal is rejected with a hazard rate "U" to determine that population variance σ is different. That is, it is estimated that $\phi_{FL}$ is smaller than $\phi_{FR}$. When the position determination unit 24 acknowledges that population variance σ clearly differs in such a manner, the difference is significant. More specifically, it is determined that there is a significant difference in population variance $\phi_{FL}$ and $\phi_{FR}$, and ID2 is associated with the axle 18b of the axle rotation information Dc having the smallest variance V to specify the tire corresponding to ID2 as the front left tire 2b. For example, the position determination unit 24 determines for each ID whether or not the difference is greater than or equal to the rejection region U between the axle rotation information Dc of the axle 18 having the smallest variance V and the axle rotation information Dc of the axle 18 having the second smallest variance V. When the position determination unit 24 determines for each ID that the difference is greater than or equal to the rejection region U between the axle rotation information Dc of the axle 18 having the smallest variance V and the axle rotation information Dc of the axle 18 having the second smallest variance V, the position determination unit 24 specifies the tire corresponding to the ID as the tire of the axle 18 having the smallest variance V. Here, the rejection region U may be set to a value of 1 to 5%.

In the same manner, the position determination unit 24 associates ID1, ID3, and ID4 with the axles 18a, 18c, and 18d to specify the front right tire 2a, the rear right tire 2c, and the rear left tire 2d. When finishing the association of all four wheels, the position determination unit 24 registers the determination result to the memory 15.

In addition to advantages (1) to (8) of the first to third embodiments, the structure of the fourth embodiment has the advantages described below.

(9) Tire positions are determined with only the relative evaluation, and the absolute evaluation is not used. Thus, tire positions can be determined by relatively comparing the axle rotation information Dc. This allows for tire position determination in a flexible manner in accordance with various traveling conditions (traveling on paved roads or rough roads).

(10) Tire positions are determined without an absolute threshold value. Thus, tire positions can be specified with a relatively small amount of data under a traveling condition in which determination can be performed easily, for example, when traveling on a paved road that includes many curves.

(11) A method for statistically determining population variance σ is used for determining tire positions. Since tire positions are determined with the method that is based on a statistical theory, namely, determination, various types of determination such as control of the probability of incorrect determination in the rejection region U can be used.

FIFTH EMBODIMENT

A fifth embodiment will now be described with reference to FIGS. 18 and 19. In the fifth embodiment, the method for determining tire positions described in the fourth embodiment is modified. In the same manner as the fourth embodiment, the description of the fifth embodiment centers on parts differing from the first to third embodiments.

Figures 18, 19:
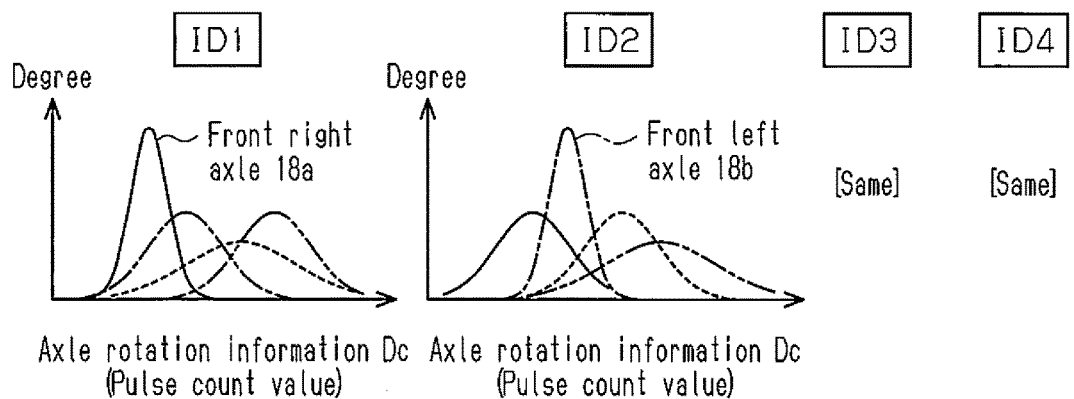
FIG. 18 is a degree distribution graph showing axle rotation information of valve IDs in a fifth embodiment.
FIG. 19 is a list of ranked variance distribution.

As shown in FIG. 18, in each of the valve IDs (ID1 to ID4), the distribution of the axle rotation information Dc is small as long as the axle rotation information Dc of the axle 18 is synchronized with the tires 2. Thus, the position determination unit 24 of this example associates the valve IDs (ID1 to ID4) with the axles 18a to 18d by obtaining the distribution data of the axle rotation information Dc of each of the axles 18a to 18d for each of the valve IDs and by checking the axle rotation information Dc where the distribution is small.

As shown in FIG. 19, the position determination unit 24 generates a list 35 when determining tire positions. The list 35 ranks variance V for each of the valve IDs (ID1 to ID4) from smaller ones. In a single valve ID of the list 35, the axle 18 that shows "1" is a candidate wheel having the smallest variance V. Thus, when "1" does not overlap in a pair of a valve ID and an axle 18, the pair is determined as being a correct combination. When pairs are specified for every one of the valve IDs, determination of tire positions is finished.

When determining tire positions by generating the list 35, it is preferred that a pair be specified for preventing incorrect determination when there is a sufficiently large difference between the wheel having the smallest variance V and the wheel having the second smallest variance V. More specifically, it is preferred that the position determination unit 24 specify a pair when finishing the ranking of "1" to "4" in a certain valve ID, calculating the difference between the wheel having the smallest variance V and the wheel having the second smallest variance V, and recognizing that the difference is greater than or equal to the threshold value. Here, variance V may be average absolute deviation.

In addition to advantages (1) to (10) of the first to third embodiments, the structure of the fifth embodiment has the advantage described below.

(12) Tire positions are determined from ranking, that is, relative difference. Thus, tire positions can be specified at an early stage under a traveling condition in which determination can be performed easily when, for example, the difference in variance V is large.

The embodiment is not limited to the foregoing structure. It should be understood that the embodiment may be implemented in the following forms.

In the first to fifth embodiments, when the first time period T1 approaches, the specific position information Dtm collected in the second time period T2 may be transmitted collectively during the first radio wave transmission.

In the second embodiment, the traveling determination unit 30 does not have to determine a traveling state from the output of the ABS sensor. Instead, the traveling determination unit 30 may obtain vehicle speed information from, for example, a meter ECU.

In the first to fifth embodiments, the specific position information Dtm may include various types of information, for example, a time at which a peak is detected and the time for going back to the starting point T1a of the first time period T1.

In the first to fifth embodiments, a specific position does not have to be a peak position. Instead, a specific position may be a certain position in the direction of tire rotation.

In the first to fifth embodiments, the axle rotation detector 22 may output a pulse count value detected during each of certain time intervals to the TPMS receiver 12 as numerical data.

In the first to fifth embodiments, the axle rotation detector 22 is not limited to the ABS sensor. Instead, the axle rotation detector 22 may be a member that detects a rotation position of the axle 18.

In the first to fifth embodiments, the axle rotation detector 22 may wirelessly transmit a detection signal to the TPMS receiver 12.

In the first to fifth embodiments, the axle rotation information Dc is not limited to a pulse count value. Instead, the axle rotation information Dc may be changed to other parameters as long as the axle rotation information Dc is similar to a rotation position of the axle 18.

In the first to fifth embodiments, the method for weighting may be changed in accordance with various aspects.

In the first to fifth embodiments, the tire pressure transmitter 4 does not have to detect a peak in advance in the second time period T2, during which radio waves are not transmitted. Instead, the tire pressure transmitter 4 may transmit the ID radio wave signal Spi when detecting a peak in the first time period T1 that allows transmission of radio waves.

In the first to fifth embodiments, the tire pressure transmitter 4 may periodically transmit the ID radio wave signal Spi.

In the first to fifth embodiments, the first radio wave signal and the second radio wave signal may be the same radio wave signal.

In the first to fifth embodiments, distribution is not limited to variation, average of deviation, and standard deviation. Instead, distribution may be changed to other parameters as long as synchronization of a tire ID and an axle 18 is recognizable.

The invention claimed is:

1. A tire position determination system comprising:
transmitters respectively coupled to tires, wherein each of the transmitters is capable of transmitting a first radio wave signal that includes pressure data and a tire ID;
rotation detectors respectively arranged on axles, wherein each of the rotation detectors detects rotation of a corresponding one of the axles and generates axle rotation information; and
a receiver arranged on a vehicle body, wherein the receiver is capable of receiving the first radio wave signal transmitted from each of the transmitters, wherein
each of the transmitters includes:
a controller that detects that the transmitter has reached a specific position on a rotation path of the tire, and
the controller generates a second radio wave signal, which includes an ID and data indicating that the transmitter has reached the specific position on the rotation path of the tire, based on a detection result detected by the controller and transmits the second radio wave signal from the transmitter, and
the receiver includes:
a processor that acquires the axle rotation information from each of the rotation detectors whenever the receiver receives the second radio wave signal, and
the processor calculates a distribution of the axle rotation information for each of the IDs by collecting statistics of the axle rotation information for each of the IDs and determines tire positions of the tires by specifying an ID of a tire that rotates in synchronism with the axle rotation information of each of the axles based on the distribution, wherein
in an operation of the transmitter, a relatively short first time period, during which transmission of a radio wave signal is allowed, and a second time period, during which transmission of a radio wave signal is temporarily stopped, are alternately repeated, and
the controller transmits the second radio wave signal a number of times in the first time period.

2. A tire position determination system comprising:
transmitters respectively coupled to tires, wherein each of the transmitters is capable of transmitting a first radio wave signal that includes pressure data and a tire ID;
rotation detectors respectively arranged on axles, wherein each of the rotation detectors detects rotation of a corresponding one of the axles and generates axle rotation information; and
a receiver arranged on a vehicle body, wherein the receiver is capable of receiving the first radio wave signal transmitted from each of the transmitters, wherein
each of the transmitters includes:
a controller that detects that the transmitter has reached a specific position on a rotation path of the tire, and
the controller generates a second radio wave signal, which includes an ID and data indicating that the transmitter has reached the specific position on the rotation path of the tire, based on a detection result detected by the controller and transmits the second radio wave signal from the transmitter, and
the receiver includes:
a processor that acquires the axle rotation information from each of the rotation detectors whenever the receiver receives the second radio wave signal, and
the processor calculates a distribution of the axle rotation information for each of the IDs by collecting statistics of the axle rotation information for each of the IDs and determines tire positions of the tires by specifying an ID of a tire that rotates in synchronism with the axle rotation information of each of the axles based on the distribution,
wherein the processor performs absolute evaluation, which determines validity of the distribution using the axle rotation information of each of the axles, and relative evaluation, which determines validity of the distribution using the axle rotation information of the axles, to determine a tire position based on a result of the absolute evaluation and a result of the relative evaluation.

3. The tire position determination system according to claim 1, wherein the processor performs relative evaluation that determines validity of the distribution using variance of the axle rotation information of the axles to determine a tire position based on a result of the relative evaluation.

4. The tire position determination system according to claim 1, wherein
the processor of the receiver further determines a traveling state, and weights the second radio wave signal received by the receiver based on the traveling state determined by the processor; and
the processor calculates a distribution of the axle rotation information for each of the IDs by collecting statistics on the axle rotation information that reflects the weighting for each of the IDs and determines tire positions of the tires based on the distribution.

5. The tire position determination system according to claim 4, wherein the processor is capable of determining a speed of a vehicle, and weights the second radio wave signal based on speed dependency.

6. The tire position determination system according to claim 4, wherein the processor is capable of determining acceleration and deceleration of a vehicle, and weights the second radio wave signal based on acceleration/deceleration dependency.

7. A tire position determination system comprising:

transmitters respectively coupled to tires, wherein each of the transmitters is capable of transmitting a first radio wave signal that includes pressure data and a tire ID;

rotation detectors respectively arranged on axles, wherein each of the rotation detectors detects rotation of a corresponding one of the axles and generates axle rotation information; and a receiver arranged on a vehicle body, wherein the receiver is capable of receiving the first radio wave signal transmitted from each of the transmitters, wherein each of the transmitters includes:

a controller that detects that the transmitter has reached a specific position on a rotation path of the tire, and the controller generates a second radio wave signal, which includes an ID and data indicating that the transmitter has reached the specific position on the rotation path of the tire, based on a detection result detected by the controller and transmits the second radio wave signal from the transmitter, and the receiver includes:

a processor that acquires the axle rotation information from each of the axle rotation detectors whenever the receiver receives the second radio wave signal, and the processor calculates a distribution of the axle rotation information for each of the IDs by collecting statistics of the axle rotation information for each of the IDs and determines tire positions of the tires by specifying an ID of a tire that rotates in synchronism with the axle rotation information of each of the axles based on the distribution, wherein, when a tire position of a tire of a specific ID is not specified, and a plurality of candidate tires remain, and when a tire position of a tire of another ID is specified, the processor deletes the specified tire from the plurality of candidate tires and narrows down or specifies a correct tire.

8. The tire position determination system according to claim 2, wherein the processor statistically determines variance of the axle rotation information of the axles as the relative evaluation to determine tire positions of the tires.

9. The tire position determination system according to claim 2, wherein the processor relatively evaluates variance of the axle rotation information of the axles and ranks the axles to determine tire positions of the tires.

10. The tire position determination system according to claim 1, wherein the receiver includes an information storage that holds one or more pieces of specific position information indicating a time at which the transmitter reached a specific position on a rotation path of the tire, the controller transmits the second radio wave signal including an ID and the one or more pieces of specific position information held in the second time period, and the processor calculates, based on the specific position information that is received by the receiver, axle rotation information at a point of time when the transmitter previously reached a specific position and determines tire positions of the tires using the calculated axle rotation information.

11. The tire position determination system according to claim 2, wherein the processor of the receiver further determines a traveling state, and weights the second radio wave signal received by the receiver based on the traveling state determined by the processor, and the processor calculates a distribution of the axle rotation information for each of the IDs by collecting statistics on the axle rotation information that reflects the weighting for each of the IDs and determines tire positions of the tires based on the distribution.

* * * * *